United States Patent [19]
Maroshick

[11] 3,913,497
[45] Oct. 21, 1975

[54] MOVABLE STEP ASSEMBLY FOR TRANSIT VEHICLES

[75] Inventor: Max Maroshick, Glen Mills, Pa.

[73] Assignee: The Boeing Company, Seattle, Wash.

[22] Filed: Oct. 23, 1974

[21] Appl. No.: 517,360

[52] U.S. Cl................................. 105/447; 280/166
[51] Int. Cl.² ....................................... B61D 23/02
[58] Field of Search ........................... 105/443–449; 280/164, 166, 511; 182/156, 157

[56] References Cited
UNITED STATES PATENTS
| | | | |
|---|---|---|---|
| 808,076 | 12/1905 | Felkner et al...................... | 105/447 |
| 3,672,311 | 6/1972 | Duba et al.......................... | 105/447 |

Primary Examiner—M. Henson Wood, Jr.
Assistant Examiner—Richard A. Bertsch
Attorney, Agent, or Firm—Joseph M. Corr; Frederic W. Neitzke

[57] ABSTRACT

A movable step assembly for use in mass transit vehicles to accommodate variation in passenger off and on loading facilities, said steps being movable to permit on and off loading at street level and on and off loading onto subway and other elevated platforms.

3 Claims, 6 Drawing Figures

MOVABLE STEP ASSEMBLY FOR TRANSIT VEHICLES

BACKGROUND OF THE INVENTION

This invention relates to mass transit vehicles and more particularly to a stairway structure for such vehicles which will accommodate varying heights of passenger off and on loading. Considerable difficulty is experienced in adapting mass transit vehicles to variation in passenger off and on loading facilities. The situation is particularly acute where the mass transit vehicle must accommodate passengers which enter from a street level and also from subway or elevated platforms.

While various types of movable stairway structures have been developed these structures suffer from various deficiencies. For instance, a stairway structure to be operable in a practical sense in such mass transit vehicles must be capable of movement to various operative positions while passengers stand on the stairway surfaces. The stairs must be capable of motion with the entrance doors closed. This means not only that all stair surfaces must be maintained during movement in an horizontal plane but also that all working parts must be so positioned as to not contact the passengers and large gaps between the movable step members and the supporting or surrounding structure must be avoided. The step assembly must be so designed that it will not jam in operation when subjected to twisting or shearing moments imposed by motion of the mass transit vehicle. Further, the steps should be light-weight and self-locking, so that motion of the steps will not occur in the event of a power failure in the step actuation means. The actuation linkage must be so designed that it will not be jammed by the debris and foreign materials normally encountered in service.

SUMMARY OF THE INVENTION

This invention is directed to providing a movable step assembly for use on mass transit vehicles which allows for variations of the height of the steps while the entrance door of the vehicle is closed and passengers are standing on the steps. The assembly is rugged and light-weight, employing a novel actuation linkage which moves the outboard step in a straight line motion, obviating the need for guiding tracks or rails which are easily jammed in service. A torque tube incorporated into the support structure of the steps allows for a very light-weight design which is not susceptible to jamming when the transit vehicle is subjected to bending or twisting moments. A torque tube compensates for uneven loads imposed on the steps caused by passengers occupying one end of the steps, making it possible to use a single actuator. Without the torque tube, a single-actuator linkage would be subject to jamming.

It is a primary object of this invention to alleviate the aforementioned difficulties of the prior art by providing a new and novel movable step assembly which is capable of facilitating passenger movement to and from at least two elevations, such as a loading platform and street level.

It is a further object of this invention to provide a step assembly which will be safely operable while the vehicle is in service and passengers are standing on the step assembly and the entrance doors are closed.

As an additional object of this invention, a step assembly is provided which has no exposed linkages or protruding parts and has no large gaps between the movable steps and the surrounding structure in which passengers or their clothing might be caught.

Another object of this invention is to provide a step assembly which may be simply and inexpensively constructed and easily maintained, and very reliable in operation.

It is also an object of this invention to provide a light-weight step assembly which will not jam if shearing or twisting moments are imposed on the mass transit vehicle, or the loads on the steps are unevenly distributed.

These and other objects of the invention will become more readily apparent from the ensuing specification when taken with the drawings.

DESCRIPTION OF THE PREFERRED EMBODIMENT

Figure 1:
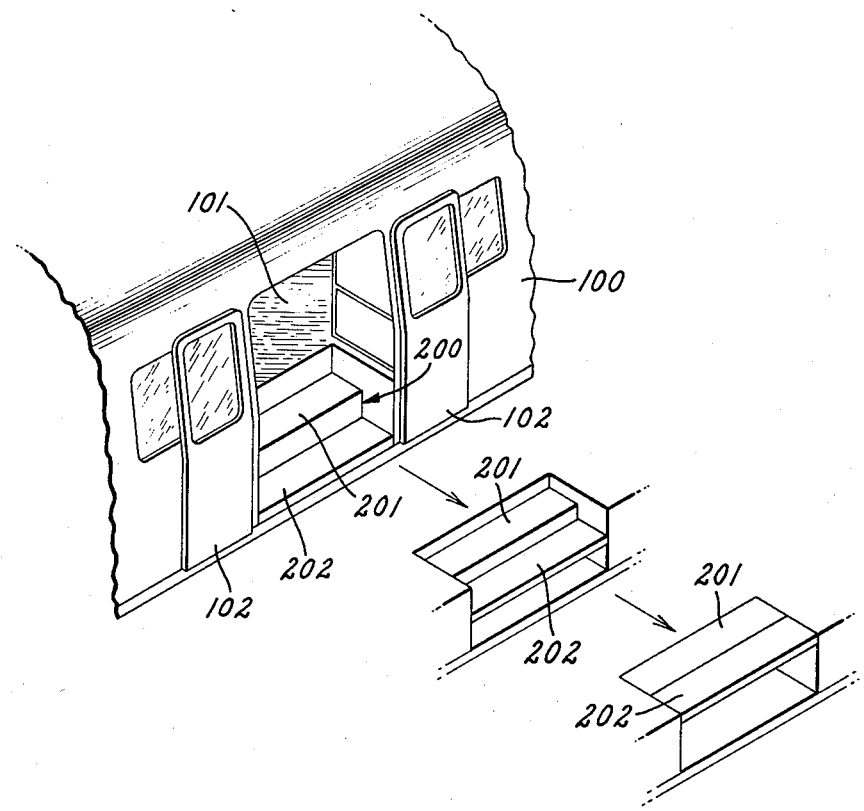
FIG. 1 is a perspective view of a doorway of a mass transit vehicle having a stairwell and showing a movable step assembly mounted therein. Three positions of the step assembly are shown.

Referring to FIG. 1 of the drawings a mass transit vehicle 100 is illustrated having a stairwell 101 and doors 102. Located within the stairwell 101 is movable step assembly 200. The step assembly 200 is generally comprised of an inboard step 201, an outboard step 202, linkage means connecting the step members; a torque tube 500, shown best in FIGS. 1, 5 and 6, connecting portions of the linkage means and an actuator to move the steps.

Figure 2:
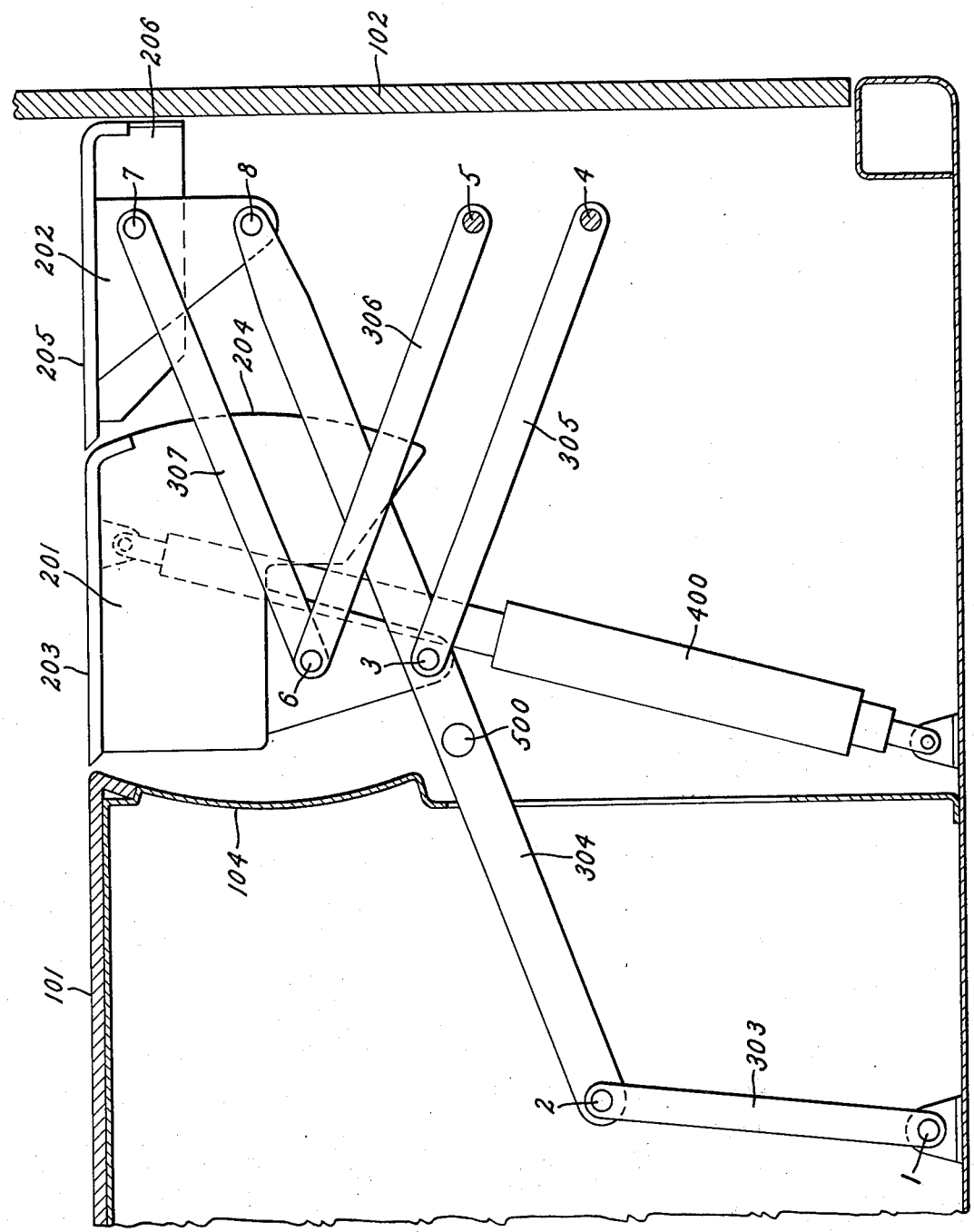
FIG. 2 is a side view of the steps in the raised position.

FIG. 2 illustrates the step assembly with the step in the raised position. The linkage connecting the steps to the transit vehicle are comprised of the following parts: For ease of illustration, only one linkage assembly is shown, but it should be understood that the linkage means consists of similar components 303, 304, 305, 306, 307 connected to each end of the steps, interconnected by torque tube assembly 500. Suspension link 303 is pivotally connected to the transit vehicle structure as shown. The other end of suspension link 303 is pivotally connected to torsion bar assembly 304, which is pivotally connected to inboard step 201, outboard step 202 and the inboard stabilizing link 305. The other end of stabilizing link 305 pivotally connects to the vehicle structure. An inboard step guide link 306 pivotally connects the inboard step and the vehicle structure. An outboard step stabilizing link 307 is pivotally connected to the inboard and outboard steps. Actuating means 400 are provided to move the step from one position to another. The actuating means 400 are illustrated applying the force to inboard steps 201, but this actuator could operate on the outboard step or other portions of the linkage. A torque tube 500 is fixedly connected between the two torsion bar ratio arms 304.

The stairwell 101 incorporates a concavely curved riser 104 with which inboard step 201 maintains close proximity along the rear face of the tread, 203, of the step assembly. The front of the inboard step 201 comprises a convexly curved riser 204 as shown. The rear face of the outboard tread 205 of outboard step assembly 202 maintains close proximity to concavely curved riser 204. The straight riser 206 of outboard step 202 remains in close proximity to the entrance doors, 102, as the step assembly moves from one position to another. It is an important feature of this invention that riser 206 travels perpendicularly to the entrance door while the steps are changing vertical position. This insures that no dangerous gaps are created between the step and the door which could endanger the passenger, without requiring a sliding extension on the steps, or guide rails.

In operation, when the steps 201 and 202 move from the fully raised to the fully lowered position, the step treads, 203 and 205 remain parallel to the floor of the transit vehicle, and the height of the exposed portion of curved risers 104 and 204 are equal at all positions of the steps. In all positions, the tread 203 of inboard step 201 and the tread 205 of outboard step 202 remain in close proximity respectively to risers 104 and 204 so that no dangerous gaps are present.

Figure 3:
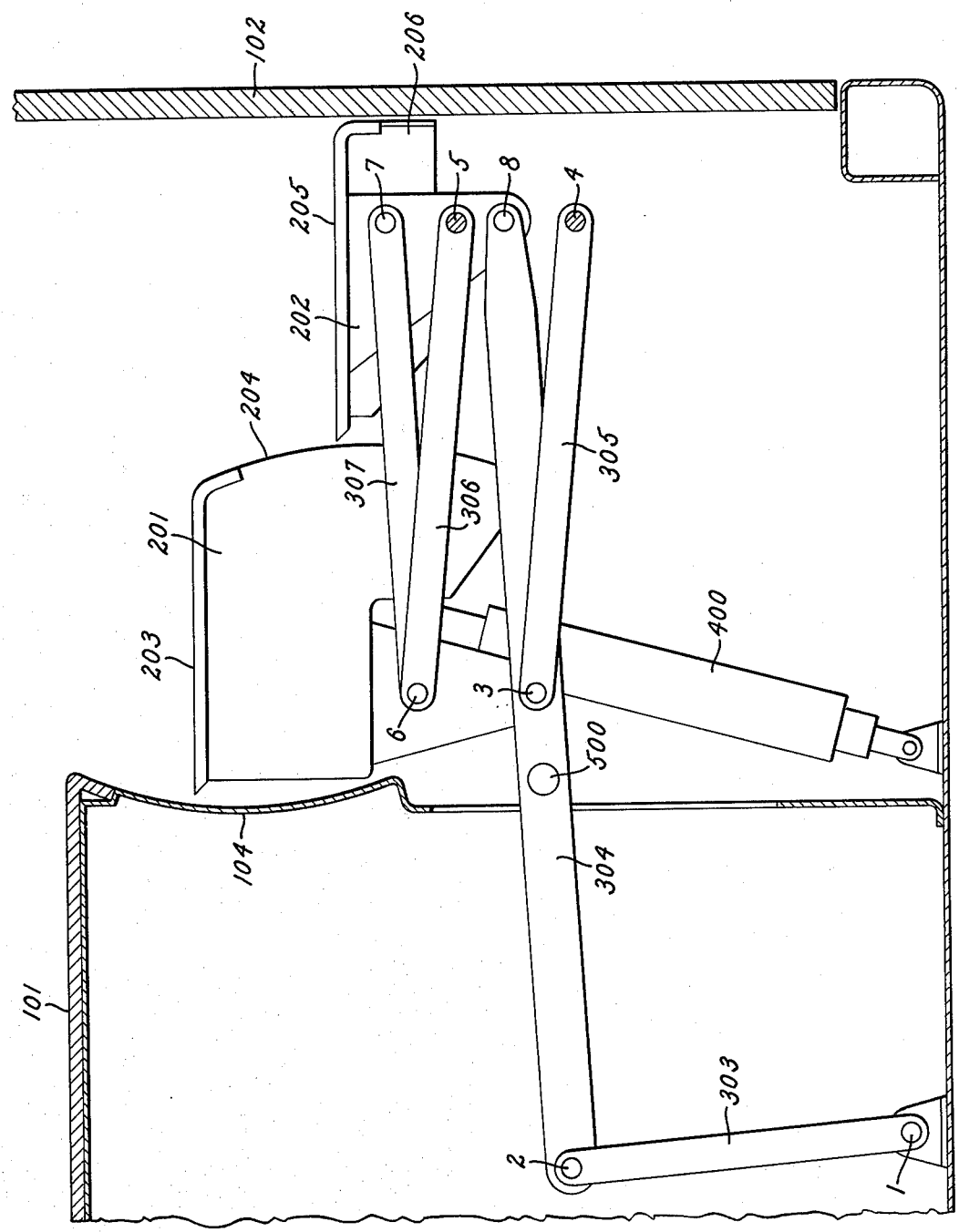
FIG. 3 is a side view of the steps in an intermediate position.
Figure 4:
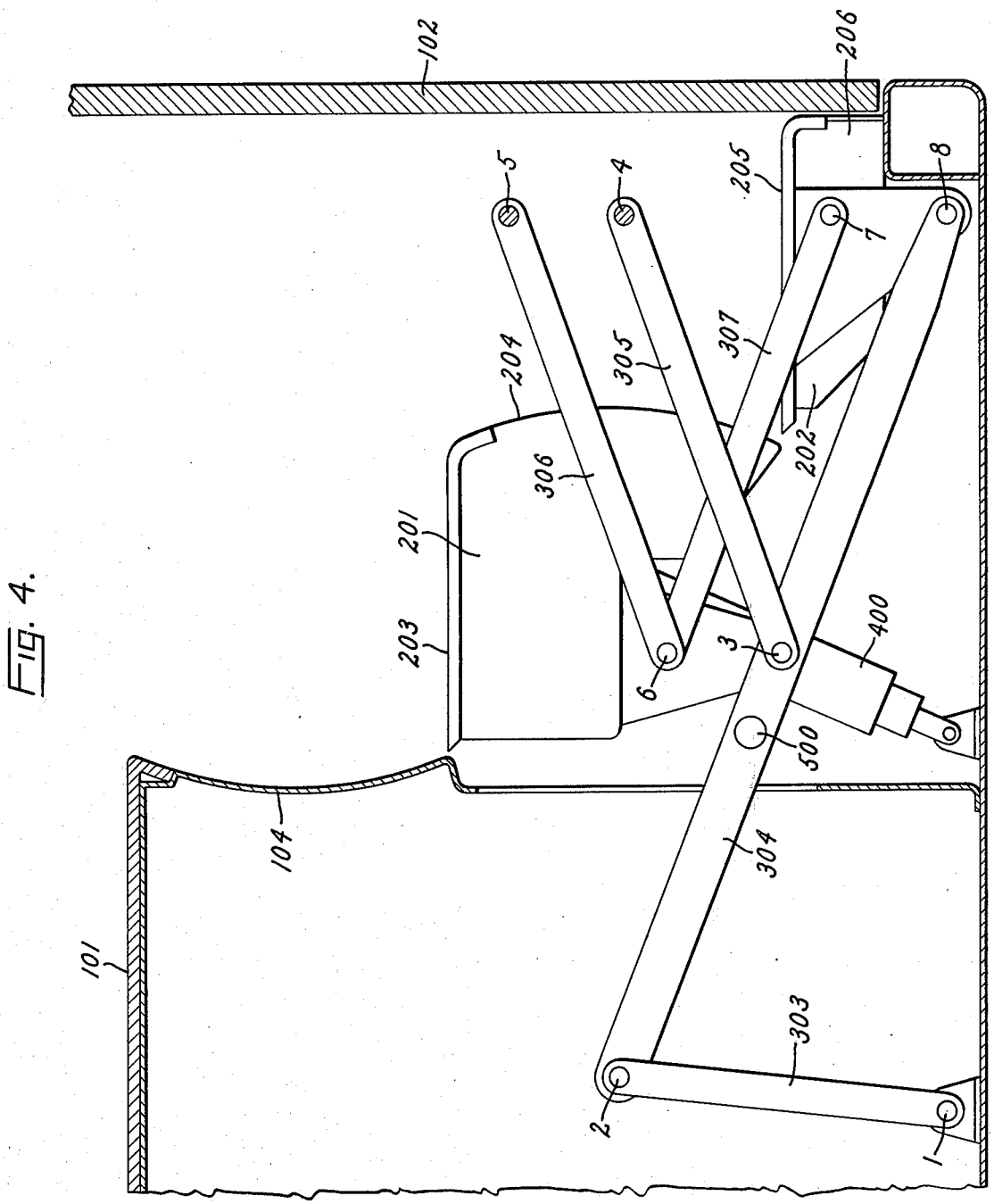
FIG. 4 is a side view of the steps in a lowered position.

The operation of the step assembly can be best understood by reference to FIGS. 2, 3 and 4. In FIG. 2 the steps are in the raised position. Outboard step 202 is pivotally connected to the ratio aim assembly 304 at 8 and the outboard step stabilizing link 307 at 7. Inboard step 201 is pivotally connected to the ratio arm assembly 304 and inboard step stabilizing link 305 at 3, and to the inboard step guide link 306 and the outboard step stabilizing bar link 307 at 6. The torsion bar assembly 304 is pivotally mounted to suspension link 303 at 2. The suspension link 303 is pivotally mounted to the vehicle structure at 1. The inboard step guide link 305 is pivotally mounted to the vehicle structure at 4, and the inboard step stabilizing link 306 is pivotally mounted to the vehicle structure at 5.

The length of segments 2-3, 3-8, 5-6, 6-7, and 3-4 govern the motion of the steps as the linkage moves. In the preferred embodiment these segments are equal, which insures that the exposed risers (104 and 204) are equal for any position of the steps and that the outboard step moves vertically as the steps change position.

FIGS. 2, 3, and 4 illustrate various positions of the step assembly.

Figure 5:
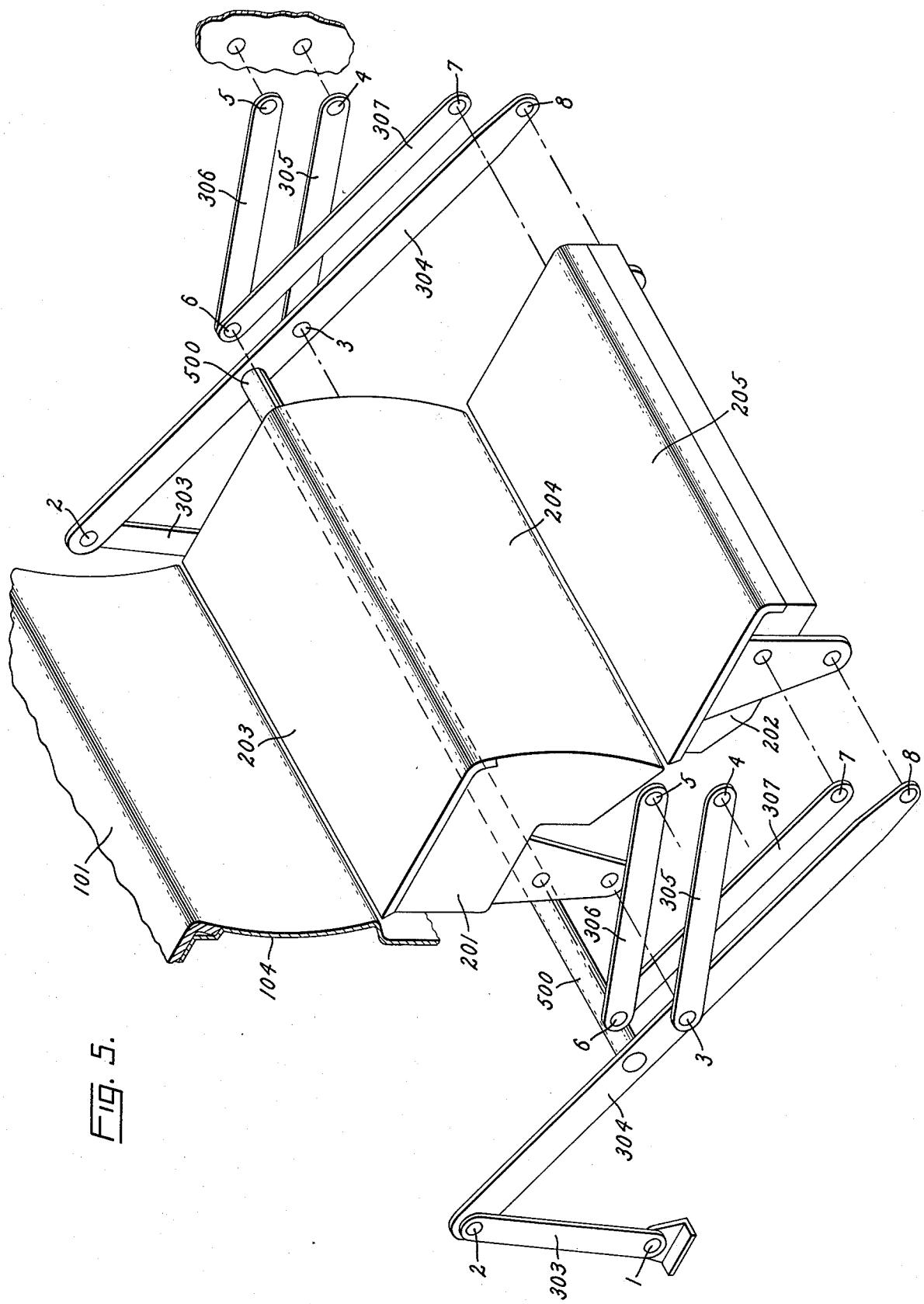
FIG. 5 is an exploded perspective view of the step assembly in the down position.
Figure 6:
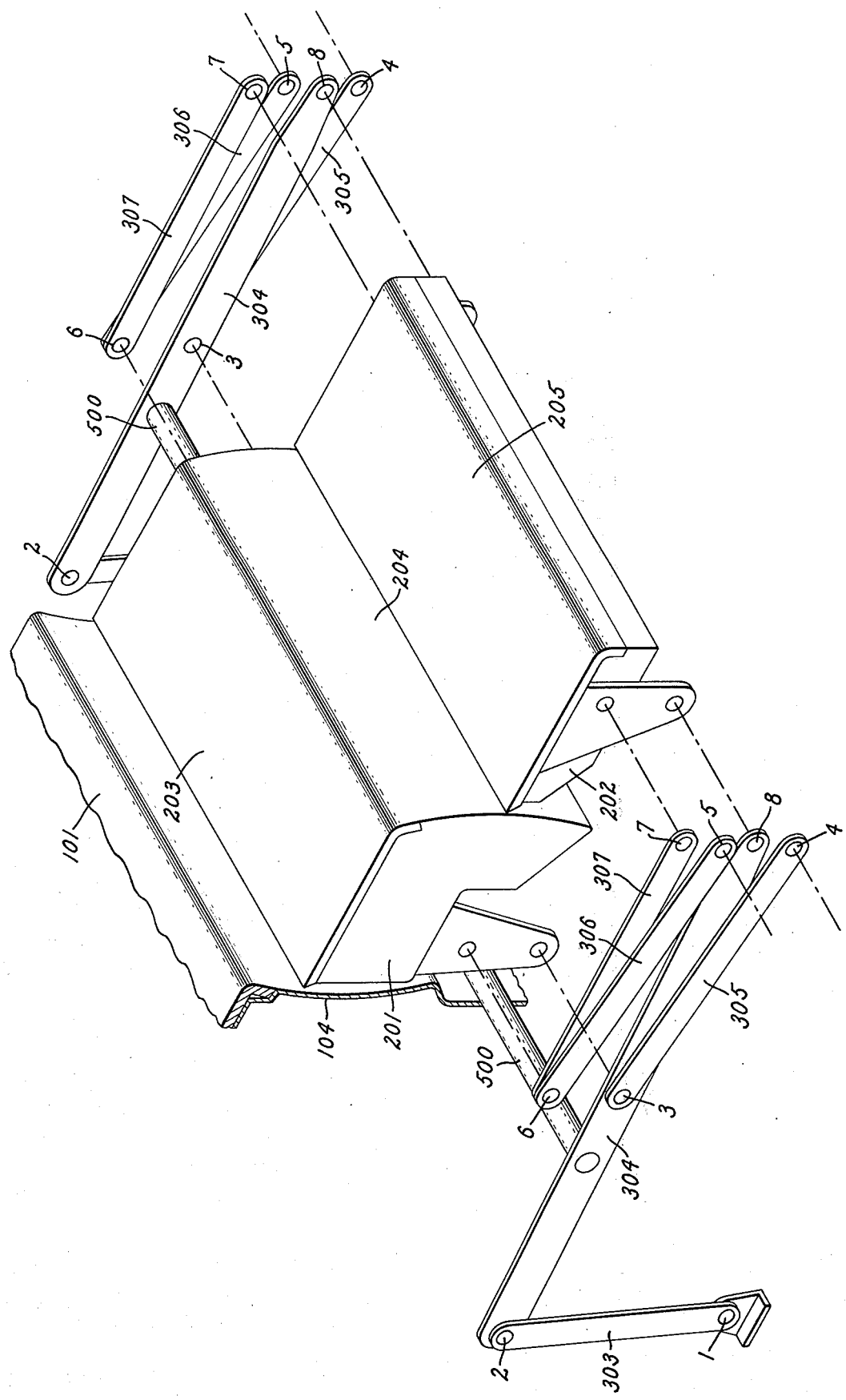
FIG. 6 is an exploded perspective view of the step assembly in an intermediate position.

FIG. 5 is a exploded perspective view of the step assembly showing both linkages connected by torque tube 500. FIG. 6 is a similar view with the steps in an intermediate position.

Torque tube 500 insures that the step assembly will not jam if subjected to shearing or twisting moments, or if the steps are unevenly loaded — for instance if all of the passengers should stand on one end of the steps.

It will be apparent to those skilled in the art that various modifications and variations could be made in the apparatus constituting this invention without departing from the scope and spirit of the invention.

What is claimed is:

1. Movable steps for use on vehicles to facilitate movement of passengers to or from said vehicle comprising:
   a. A stairwell, enclosed by movable entry doors,
   b. A first step member operatively mounted in said stairwell having a horizontally disposed upper tread surface and a convexly curved riser,
   c. A second step member operatively mounted in said stairwell having a horizontally disposed upper tread surface,
   d. Actuating means operatively associated with said step members for varying the vertical position of said step members,
   e. Vehicle structure enclosing said stairwell having a concavely curved riser maintained in close proximity to the rear face of the upper tread surface of said first step member,
   f. Linkage means connecting said first and second step members and said vehicle structure surrounding said stairwell, whereby the upper tread surfaces of the step members are maintained in a horizontal position as the said members are moved vertically, and the second step member is moved perpendicularly to said horizontal tread surface, so that said second step member maintains a constant close proximity to said entry doors.

2. The step assembly according to claim 1 wherein the linkage means comprises a similar linkage at each end of said members comprising:
   a. A suspension link pivotally connected to said vehicle structure,
   b. A ratio arm pivotally connected to said suspension link at one end and pivotally connected to said first and second step members,
   c. Stabilizing links pivotally connected to said ratio arm and step members to maintain the upper tread surface of said step members in a horizontal position during movement.

3. The step assembly according to claim 2 wherein said linkage means comprise similar linkages at each end of said step members fixedly joined by a torque tube.

* * * * *